United States Patent [19]

Hayashi et al.

[11] 4,091,615
[45] May 30, 1978

[54] INTERNAL COMBUSTION ENGINE WITH PLURAL SPARK PLUGS FOR EACH COMBUSTION CHAMBER AND EXHAUST RECIRCULATION CIRCUIT

[75] Inventors: Yoshimasa Hayashi, Yokohama; Hiroshi Kuroda, Tokyo; Yasuo Nakajima; Tooru Yoshimura, both of Yokosuka, all of Japan

[73] Assignee: Nissan Motor Company, Ltd., Japan

[21] Appl. No.: 686,529

[22] Filed: May 14, 1976

[30] Foreign Application Priority Data

May 22, 1975 Japan .................................. 50-61275
May 27, 1975 Japan .................................. 50-63726

[51] Int. Cl.² ........................................... F02M 25/06
[52] U.S. Cl. ........................................... 60/274; 60/278; 123/119 A; 123/148 C
[58] Field of Search ........ 123/119 A, 148 C, 148 DS; 60/278, 323, 274

[56] References Cited

U.S. PATENT DOCUMENTS

| | | | |
|---|---|---|---|
| 1,235,993 | 8/1917 | Miller | 123/148 C |
| 1,236,502 | 8/1917 | Tracy | 123/148 C |
| 2,257,631 | 9/1941 | Wahlberg | 60/323 |
| 3,587,541 | 6/1971 | Sarto | 123/119 A |
| 3,768,787 | 10/1973 | Marsee | 123/119 A X |
| 3,896,777 | 7/1975 | Masaki | 123/119 A |
| 3,901,202 | 8/1975 | Hollis | 123/119 A |
| 3,901,203 | 8/1975 | Pozniak | 123/119 A |
| 3,911,674 | 10/1975 | Goto | 60/278 |
| 3,981,283 | 9/1976 | Kaufman | 123/119 A |

Primary Examiner—Robert G. Nilson

[57] ABSTRACT

Each combustion chamber of an internal combustion engine is equipped with at least two simultaneously working spark plugs which are arranged distant from each other and located out of a central region of the combustion chamber, and an exhaust recirculation circuit including a flow control valve is arranged to recirculate exhaust gas to a nearly stoichiometric air-fuel mixture to be fed to the engine at a high recirculation rate on the maximum of 12–40% by volume of the quantity of air drawn into the engine.

7 Claims, 8 Drawing Figures

INTERNAL COMBUSTION ENGINE WITH PLURAL SPARK PLUGS FOR EACH COMBUSTION CHAMBER AND EXHAUST RECIRCULATION CIRCUIT

This invention relates to an internal combustion engine system including an exhaust gas recirculation circuit, wherein each combustion chamber of the engine is provided with a plurality of spark plugs.

It is one of effective and practicable measures against formation of oxides of nitrogen NOx in the operation of an internal combustion engine to recirculate a portion of the exhaust gas to air (or an air-fuel mixture) to be drawn into the engine. The recirculation of the exhaust gas causes a lowering of the maximum combustion temperature in the engine and results in suppression of the formation of NOx. The rate of lessening in the formation of NOx in the engine is almost proportional to the exhaust gas recirculation rate which is defined by the volumetric ratio of the recirculated exhaust gas to air drawn into the engine.

Accordingly the employment of a considerably high exhaust recirculation rate, for example more than 10%, is desirable for strongly suppressing the formation of NOx. It is impossible in conventional engines, however, to increase the exhaust recirculation rate as one wishes since the operation of the engines becomes progressively unstable as the recirculation rate is increased. If the recirculation of exhaust gas is carried out on a conventional spark-ignition engine at a recirculation rate of about 10% or above, the engine cannot be operated smoothly and with good responsiveness since there is a considerable chance of misfires to occur. Accordingly it is a general rule at present to carry out the exhaust recirculation on commercial engines at a recirculation rate of about 8%. It is difficult, however, to satisfactorily suppress the formation of NOx by the exhaust recirculation alone when the recirculation rate is limited to 10% or below.

As a problem from a different point of view, the exhaust recirculation usually causes an increase in the specific fuel consumption, and the rate of the increase heightens as the recirculation rate is increased.

It is an object of the present invention to provide an internal combustion engine system which includes an exhaust gas recirculation circuit to recirculate exhaust gas at a maximum recirculation rate of 12% or above but can work stably and smoothly without suffering from the occurrence of misfires.

It is another object of the invention to provide an internal combustion engine system which includes an exhaust gas recirculation circuit arranged to recirculate exhaust gas at a recirculation rate high enough to almost completely suppress the formation of NOx but does not bring about a substantial increase in the specific fuel consumption.

According to the invention, an engine system comprises: (a) an internal combustion engine wherein each combustion chamber is equipped with at least two spark plugs spaced from each other, (b) an ignition means for substantially simultaneously energizing the spark plugs for the same combustion chamber, (c) a fuel system for supplying an air-fuel mixture to each combustion chamber through an induction passage, (d) a recirculation passage interconnecting the exhaust line of the engine to the induction passage, and (e) a flow control means for controlling the flow rate of the exhaust gas through the recirculation passage such that the maximum quantity of the recirculated exhaust gas is in the range from 12 to 40% by volume of the quantity of air drawn into each combustion chamber when the operational condition of the engine is in a normal range.

The combustion chamber is preferably circular in cross section, and spark plugs for each combustion chamber are arranged to be distant from a central region of the combustion chamber and preferably symmetrically in a plan view taken parallel to the cross section with respect to a point in the central region, so that the flame propagation from the respective spark plugs to the central region is completed in a short time.

The flow control means preferably comprise a sonic nozzle and a valve member arranged to vary the cross-sectional area of the throat of the nozzle in dependence on the magnitude of vacuum created, for example, at the venturi section of the carburetor, and the nozzle is designed to establish a sonic flow when the difference between the entrance and exit pressures is 120 mmHg or greater.

The air-fuel mixture is prepared to have an airfuel ratio around a stoichiometric ratio, i.e. in the range from 13 to 16 when the fuel is gasoline.

Other features and advantages of the invention will become apparent from the following detailed description of a preferred embodiment with reference to the accompanying drawing, wherein.

Figure 7:
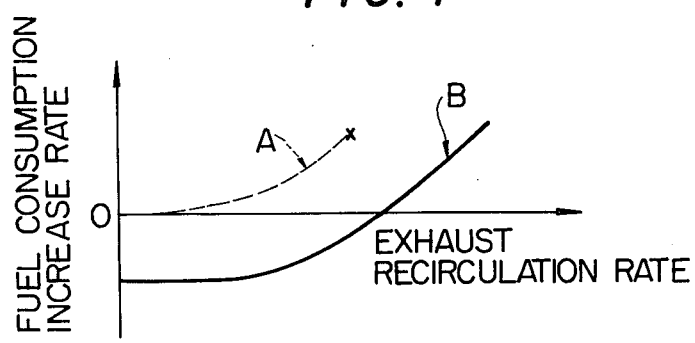
Figure 8:
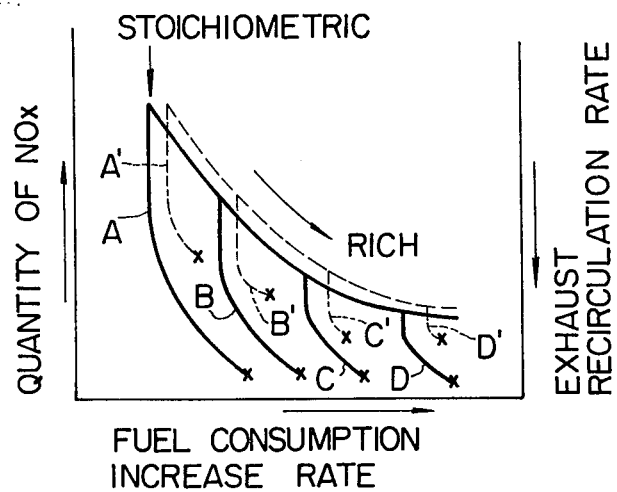

FIG. 7 is an explanatory graph showing the variation in the specific fuel consumption with respect to the variation in the exhaust recirculation rate; and FIG. 8 is an explanatory graph showing the variations in the production of NOx and the specific fuel consumption with respect to the variations in the exhaust recirculation rate and the air-fuel ratio of a combustible mixture which is diluted with the recirculated exhaust gas.

Figure 1:
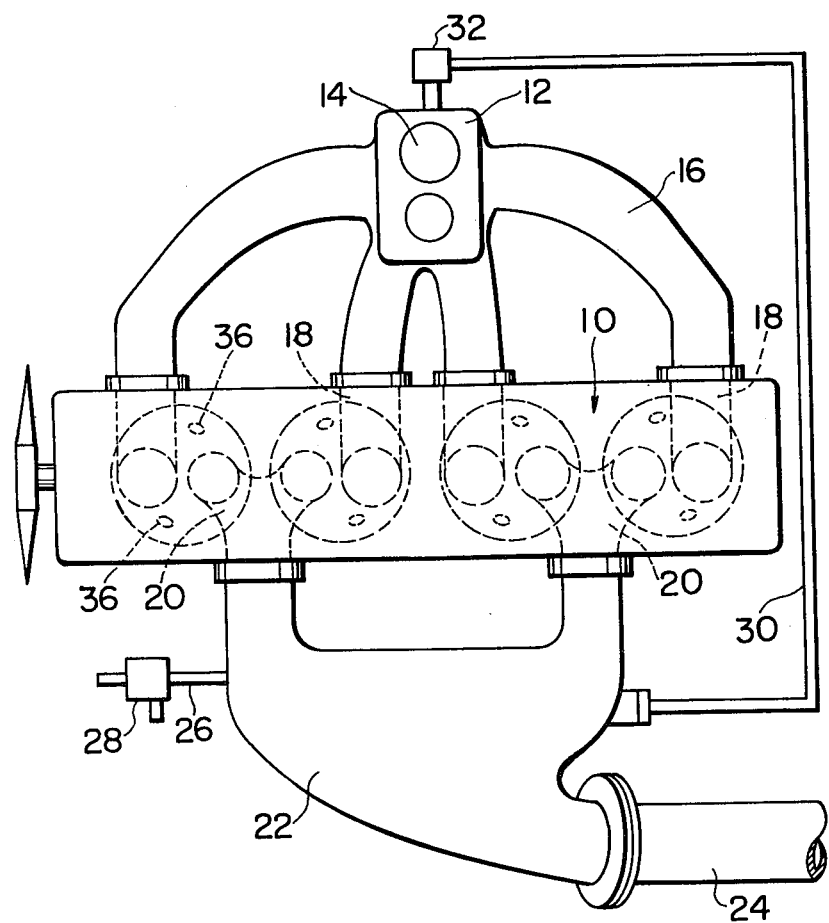
FIG. 1 is a schematic plan view of an engine system according to the invention.

An internal combustion engine system according to the invention is not particularly different from conventional internal combustion engine systems in general construction. Referring to FIG. 1, a four-cylinder internal combustion engine 10 is equipped with a carburetor 12, so that an air-fuel mixture is supplied to the respective engine cylinders through an induction passage indicated at 14, an intake manifold 16 and intake ports 18. The exhaust line of this engine 10 includes exhaust ports 20, an exhaust manifold 22, which is preferably designed to function also as a reactor for carrying out oxidation of carbon monoxide CO and unburned hydrocarbons HC, and an exhaust pipe 24. A secondary air supply circuit 26 including a flow control valve 28 may be connected to the exhaust manifold 22 when the manifold 22 functions as a thermal reactor. An exhaust gas recirculation passage 30 is arranged to interconnect the exhaust manifold 22 either to the induction passage 14 at a section downstream of the carburetor 12 or to the intake manifold 16. A flow control apparatus 32 is arranged to control the volumetric flow rate of; the exhaust gas recirculated through the passage 30. The above described general construction and arrangement are well known ones.

Figure 2:
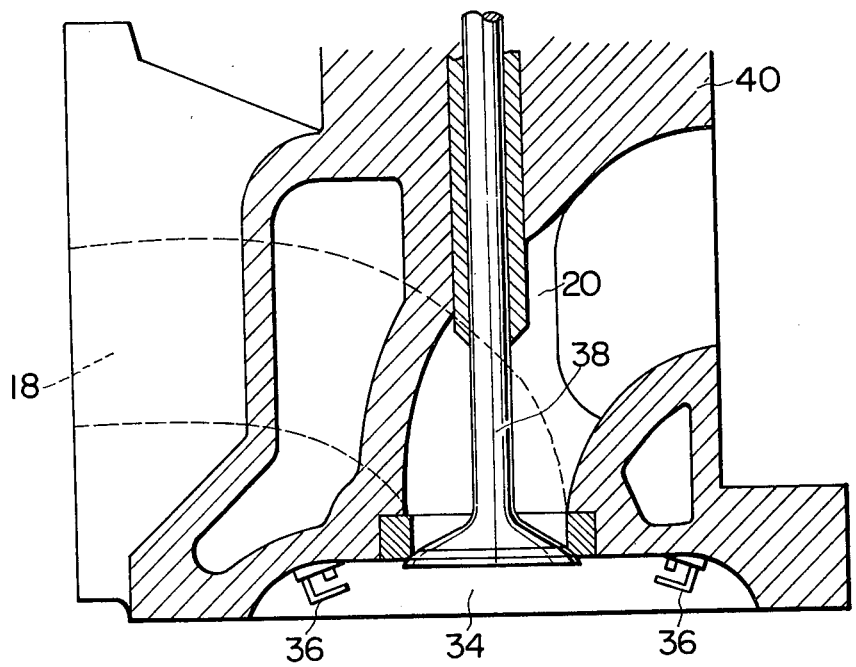
FIG. 2 is a fragmentary, longitudinal and sectional view of the cylinder head of the engine in FIG. 1 for particularly showing a combustion chamber according to the invention.

According to the invention, a combustion chamber 34 defined in each cylinder of this engine 10 is equipped with two spark plugs 36 which are arranged at a relatively long distance from one another as shown in FIG. 2. The number of the spark plugs 36 may be increased to three or more if desired. The ignition circuit (not shown) for these spark plugs 36 is formed to cause all spark plugs 36 of the same combustion chamber 34 to produce sparks practically at the same instance. These spark plugs 36 are located out of a central region of the combustion chamber 34. The combustion chamber 34 is of a relatively simple shape with circular cross sections such as, for example, a pancake shape, hemispherical shape of Heron shape. In a plan view taken transversely of the engine cylinder or parallel to a cross section of the combustion chamber, the spark plugs 36 are arranged substantially, if not exactly, symmetrically with respect to either a central axis of the combustion chamber 34 or a point in a central region of the combustion chamber 34. An intake valve (omitted from illustration) and an exhaust valve 38 are arranged in the usual manner to govern the communication between the combustion chamber 34 and the intake and exhaust ports 18 and 20. When the exhaust system of the engine 10 includes a certain means such as a thermal reactor 22 for oxidizing HC and CO contained in the exhaust gas, each exhaust port 20 for each engine cylinder is preferably formed close to another exhaust port 20 for an adjacent and nearest cylinder, and these two exhaust ports 20 join to form one passage within the cylinder head 40 at a short distance from the exhaust valves 38. Such a configuration of the exhaust ports 20 is known under the name of siamese ports and has the advantage of a lessened drop in the exhaust gas temperature during passing of the exhaust gas through the ports 20 because of a decrease in the total surface area of the exhaust ports 20.

The provision of the flow control apparatus 32 is for the purpose of regulating the quantity of the exhaust gas recirculated through the passage 30 generally proportionally to the quantity of air drawn into the intake manifold 16. It is impracticable to directly measure the volumetric flow rate of air in the induction passage 14. Accordingly, the control apparatus 32 is designed to respond to a variation in the magnitude of vacuum created at a certain section of the induction passage 14. (The vacuum is utilized as an indication of the volume of air drawn into the engine 10.)

Figure 3:
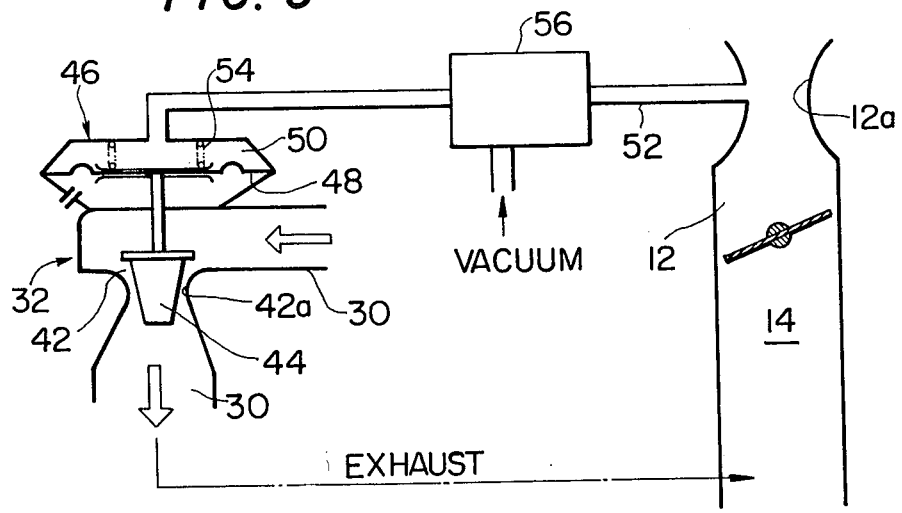
FIG. 3 is a sectional view of an exhaust recirculation rate control apparatus employed in the engine system of FIG. 1.

In an engine system according to the invention, the control apparatus 32 is preferably constructed and adjusted as described hereinafter with reference to FIG. 3. The exhaust gas recirculation passage 30 passes through, or is partly included in, the control apparatus 32 and has a venturi section 42 formed within the control apparatus 32. A valve member 44 such as, for example, a needle valve is disposed in the passage 30 so that the cross-sectional area of the passage 30 at this venturi section 42 may be varied depending on the position of the valve member 44. The control apparatus 32 includes a vacuum motor or actuator (diaphragm device) 46 which supports and moves the valve member 44 from the outside of the exhaust recirculation passage 30. A flexible diaphragm 48 of the actuator holds the valve member 44 and constitutes a wall of a vacuum chamber 50 formed in the actuator 46. A vacuum circuit 52 for the vacuum chamber 50 includes a vacuum amplifier 56 which modulates the magnitude of vacuum applied from an external vacuum source in response to the magnitude of vacuum created at the venturi section 12a of the carburetor 12. The actuator 46 and the valve member 44 are arranged such that the cross-sectional area of the recirculation passage 30 at the venturi section 42 is enlarged with an increase in the magnitude of the venturi section vacuum in the carburetor 12. The actuator 46 has a compression spring 54 arranged to push the diaphragm 48 in a direction opposite to the direction of a pulling force by the vacuum. Since the magnitude of the venturi section vacuum in the carburetor 12 is very small, the vacuum amplifier 56 (usually a diaphragm device) receives vacuum from the venturi section 12a and transmits an amplified vacuum to the vacuum chamber 50.

In an engine system according to the invention, the exhaust recirculation passage 30 and the flow control apparatus 32 are constructed such that the maximum value of the exhaust recirculation rate is in the range from 12 to 40%. However, this value needs not to be greater than 25% in most cases. The exhaust gas is recirculated preferably at a recirculation rate in the range from 12 to 25% when the operational condition of the engine 10 is in a most frequently used range (normal or cruising range) which may be represented by an engine speed range between about 1500 and about 3000 rpm with respect to a typical automotive engine. To realize and constantly maintain such a high recirculation rate, the venturi section 42 and the valve member 44 in the control apparatus 32 are shaped such that the flow of the exhaust gas in the recirculation passage 30 attains the velocity of sound at the narrowest section or a throat 42a of the venturi section 42 when the pressure difference in the passage 30 between the sections upstream of the venturi section 42 and sections downstream of the venturi section 42 is at least about 120 mmHg. Accordingly, this venturi section 42 can be regarded as a sonic nozzle. When the flow of the exhaust gas through the venturi section or sonic nozzle 42 is sonic at the throat 42a, the volumetric flow rate of the exhaust gas through the nozzle 42 is determined solely by the effective cross-sectional area of the throat 42. In this state, the volumetric flow rate of the recirculated exhaust gas is affected by neither the intake vacuum nor the exhaust pressure in the engine system. Accordingly it becomes easy to accurately maintain the exhaust recirculation rate at a predetermined value by varying the position of the valve member 44 in dependence on the magnitude of the vacuum at the venturi section 12a.

The flow of the exhaust gas can attain a sonic velocity at the throat 42a even when the venturi section 42 is not so particularly shaped as to function as a sonic nozzle if the pressure difference between the entrance and exit of the venturi section 42 is greater than about 350 mmHg. However, the necessity for such a great pressure difference is inconvenient to the accomplishment of the exhaust recirculation at a high recirculation rate.

Figure 4:
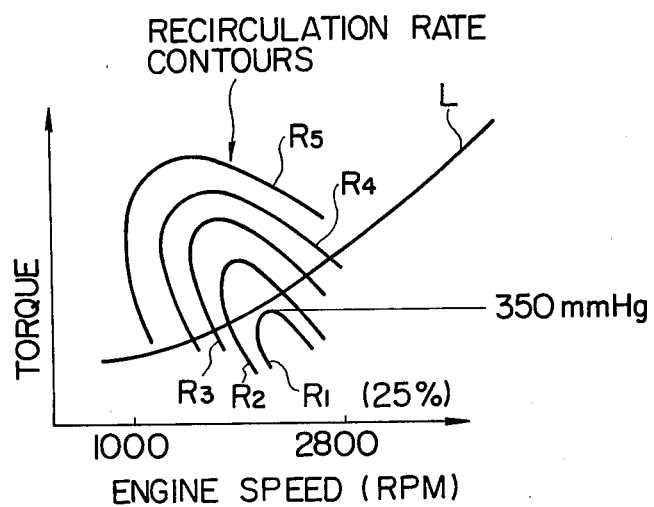
FIG. 4 is a graph showing the dependence of a realizable exhaust recirculation rate on the speed and torque of an internal combustion engine when the recirculation is controlled by a commonly used control apparatus.

When the exhaust pressure upstream of the venturi section 42 is nearly equal to the atmospheric pressure, the pressure difference across the venturi section 42 can be regarded as the magnitude of the intake vacuum. The volumetric flow rate of the exhaust gas through the venturi section 42, therefore, is determined by the magnitude of the intake vacuum until the velocity of the exhaust gas flow at the throat 42a reaches sonic if the valve member 44 is kept stationary in a certain position. If the venturi section 42 is not shaped as a sonic nozzle and the flow of the exhaust gas becomes a sonic flow at an intake vacuum of −350 mmHg, the exhaust recirculation rate is determined by the speed and torque of the engine 10 as represented by the curves $R_1$ to $R_5$ in the graph of FIG. 4, where the smaller the subscripts 1-3 are the greater the recirculation rate is. The curve L in the graph represents the relationship between the speed and torque under the road-load condition. If the position of the valve member 44, i.e. the effective cross-sectional area of the venturi section 42, is such that the recirculation rate reaches 25% when the flow of the exhaust gas becomes sonic, the recirculation rate of 25% is realizable on the curve $R_1$ in the graph of FIG. 4. This curve $R_1$ lies below the road-load curve L. This means impossibility of realizing a recirculation rate of 25% in a normal operational range of the engine 10. The recirculation rate reaches 25% only under particular operational conditions characterized by a large magnitude of intake vacuum and a small output such as an idling condition and a decelerating condition. Since the formation of NOx lessens under idling and decelerating conditions than in a normal operational range, the impossibility of increasing the exhaust recirculation rate to a desirably high rate such as 25% in a normal operational range is quite inconvenient to the suppression of the formation of Nox by the recirculation of the exhaust gas.

Figure 5:
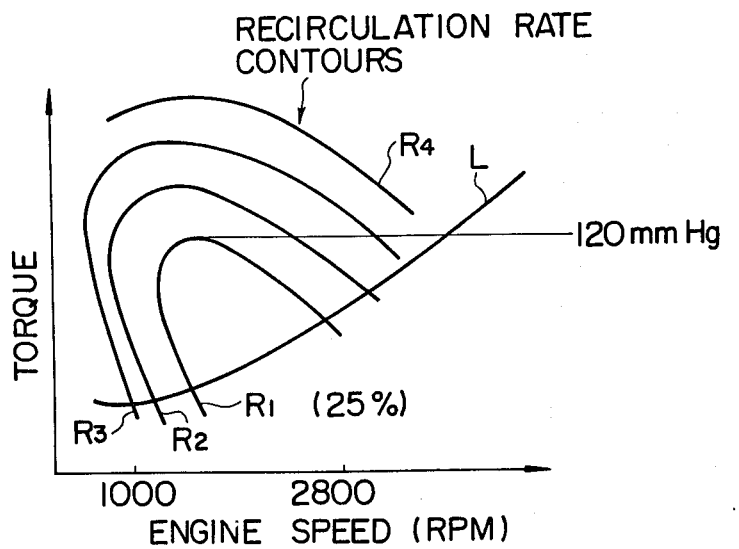
FIG. 5 is a similar graph for a case when the control apparatus of FIG. 3 is used.

In the case when the venturi section 42 and the valve member 44 are shaped to render the venturi section 42 a sonic nozzle which allows the exhaust gas flow to become sonic at an intake vacuum of at least 120 mmHg, the exhaust recirculation rate with the valve member 44 kept in a definite position is realized as represented by the curves $R_1$-$R_4$ in the graph of FIG. 5. In this graph, the curve $R_1$ represents a recirculation rate of 25% and shows that a 25% recirculation rate is realized in a normal operational range of the engine 10. The above comparison between the two cases was given on the assumption that the effective cross-sectional area of the venturi section 42 is the same between the two cases. Of course it is possible to realize a sufficiently high recirculation rate such as 25% in a normal operational range of the engine 10 even when the flow of the exhaust gas remains subsonic only if a control valve represented by the venturi section 42 has a sufficiently large effective cross-sectional area. However, the recirculation rate is further increased when the engine 10 is operated under relatively low load conditions, so that a stable operation of the engine 10 in low load conditions is hardly expected. Besides, it is very difficult to maintain the exhaust recirculation rate at a predetermined value, e.g. at 25%, when the operational condition of the engine 10 is in a normal range since the velocity of the exhaust gas flow at the venturi section 42 greatly varies depending on the magnitude of the intake vacuum.

The carburetor 12 is adjusted to produce an air-fuel mixture having an air-fuel ratio around a stoichiometric ratio. Numerically with respect to gasoline as the fuel, the air-fuel ratio is determined within the range from 13 to 16.

It is permissible to employ a fuel injector system in place of the carburetor 12.

The air-fuel mixture is admixed with the recirculated exhaust gas the amount of which is controlled by the control apparatus 32 according to the magnitude of the intake vacuum, i.e. the vacuum of air drawn into the engine 10, before the flow of the air-fuel mixture arrives at the intake ports 18. A resulting mixture is drawn into the combustion chamber 34 and compressed in the usual manner.

The two spark plugs 36 produce sparks simultaneously so that the combustible mixture which has been diluted with the exhaust gas is ignited at two distance places. The thus produced two flames propagate towards a central region of the combustion chamber 34. Accordingly, the combustion of the mixture can proceed all over the combustion chamber 34 in quite a short time. When the spark plugs 36 are arranged exactly symmetrically (in a plan view as described hereinbefore) with respect to a central point of the combustion chamber 34, the flames can spread over the entire region of the combustion chamber 34 in a time which is nearly equal to $\frac{1}{2}$ of a time required for completion of the flame propagation in a conventional combustion chamber equipped with a single spark plug. Besides, each of the two flames serves as an auxiliary heat source for sustaining the other flame. Accordingly, the combustion can proceed stably and rapidly even though the recirculation of the exhaust gas is carried out at a recirculation rate as high as 12-25%. As the result, little NOx is produced in the combustion chamber 34 of this engine system. Of course the reliability of the ignition of the diluted mixture is greatly improved by the provision of the two spark plugs 36 in each combustion chamber 34.

If the exhaust recirculation rate is made to be above about 10% for a conventionally designed combustion chamber with the provision of only one spark plug, the engine can hardly be operated smoothly and with good responsiveness since there is a considerable chance for misfires to occur. Besides, quenching of flame chances to occur in such a case before the flame reaches marginal regions of the combustion chamber even when the ignition of the diluted mixture is accomplished and results in a noticeable lowering of the output.

The valve member 44 in the flow control apparatus 32 is moved in accordance with changes in the magnitude of vacuum at the venturi section 12a of the carburetor 12, and the velocity of the flow of the recirculated exhaust gas at the throat 42a of the sonic nozzle 42 is constantly sonic when the difference between the entrance and exit pressures of the nozzles 42 is 120 mmHg or greater. Accordingly, the volumetric flow rate of the exhaust gas through the nozzle 42 is determined exclusively by the position of the valve member 44 when the pressure difference is 120 mmHg or greater. In such a state, the exhaust recirculation rate can be maintained constantly at a predetermined value since the position of the valve member 44 is governed by the magnitude of the venturi section vacuum which is closely related to the volume of air drawn into the intake manifold 16.

The velocity of the flow of the exhaust gas at the throat 42a remains subsonic and is variable when the pressure difference is less than 120 mmHg, and the exhaust recirculation rate for any given position of the valve member 44 is below a rate established with a sonic flow. However, since the use of the sonic nozzle 42 allows the employment of the maximum recirculation rate, i.e. 25%, in a normal operational range, the recirculation rate can be maintained constant almost throughout a normal operational range by settling the recirculation rate at a value somewhat below 25%.

In general, the recirculation of the exhaust gas causes an increase in the fuel consumption of the engine. The fuel consumption increases as the exhaust recirculation rate is made higher. The curve A in the graph of FIG. 7 shows such a tendency in a conventional internal combustion engine, and the curve B shows the relationship between the exhaust recirculation rate and the rate of increase in the specific fuel consumption in an engine system according to the invention. As seen from this graph, the specific fuel consumption is smaller than that of a conventional engine at any exhaust recirculation rate. The difference between the curves A and B when the exhaust gas is not recirculated arises for the following reason.

Figure 6:
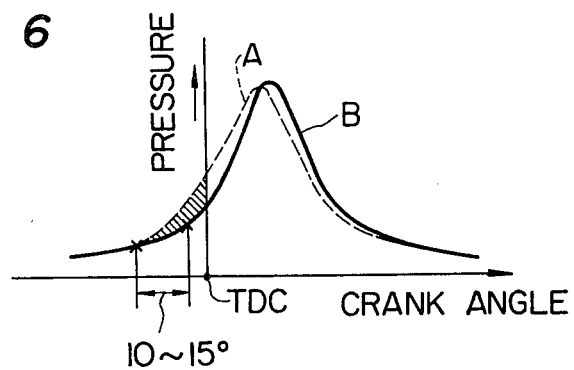
FIG. 6 is an explanatory graph showing the relationship between the ignition advance and the combustion pressure in a conventionally designed combustion chamber and a combustion chamber according to the invention.

In an engine system according to the invention, the ignition timing is so adjusted as to realize a "minimum advance for best torque" (M.B.T.) characteristic as is usual in conventional engine systems. Accordingly, the ignition timing in this engine 10 is retarded by 10°–15° expressed by the crank angle from a normal ignition timing in a similar engine which has only one spark plug for each combustion chamber. However, the combustion in the combustion chamber 34 of this engine 10 is completed in a shortened time due to a simultaneous ignition at the two spark plugs 36. In other words, the chamber pressure reaches a peak at a shortened interval of time from the instance of the ignition as shown in FIG. 6, wherein the curves A and B respectively represent a conventional engine with a single spark plug for each combustion chamber and the engine 10 of the invention. A lowered spark advance in the engine 10 results in a decrease in the negative work or loss at each compression stroke (the work done until the piston reaches the top dead center) theoretically by the amount corresponding to the hatched area in FIG. 6. This means the saving of a portion of the fuel energy which is consumed in the negative work in a conventional engine.

In conventional engines with an exhaust recirculation circuit and a reactor for treating HC and CO, the ignition timing is sometimes slightly retarded and deviated from a M.B.T. characteristic to raise the temperature of the exhaust gas. Such a retardation or deviation from an optimum timing is unnecessary in an engine system according to the invention even when the system includes a thermal or catalytic reactor since the lowering of the exhaust gas temperature is minimied by the employment of siamese exhaust ports.

Both the quantity of NOx produced in the combustion chamber 34 and the specific fuel consumption of the engine 10 are affected not only by the exhaust recirculation rate but also by the air-fuel ratio of the combustible mixture supplied to the engine 10. The quantity of NOx reaches a peak when the combustible mixture has an air-fuel ratio close to a stoichiometric ratio and decreases as the combustible mixture becomes either richer or leaner. When the recirculation of the exhaust gas is carried out, it is a usual way to employ an air-fuel ratio which is either close to or below a stoichiometric ratio because the combustion becomes significantly unstable if a lean mixture is admixed with the exhaust gas.

The graph of FIG. 8, wherein the solid lines and the broken lines respectively represent an engine according to the invention and a conventional engine, shows the variations in the quantity of NOx produced in the engine and the rate of increase in the specific fuel consumption with respect to a variation in the exhaust recirculation rate also by the use of the air-fuel ratio as another parameter. The cures A and A' represent a stoichiometric air-fuel ratio. The curves B and B', C and C', and D and D' respectively represent three different air-fuel ratios which become lower in the alphabetrical order. As seen in this graph, the quantity of NOx decreases as the recirculation rate is increased, but the fuel consumption at a given air-fuel ratio (e.g. the stoichiometric ratio represented by curve A) increases when the recirculation rate exceeds a certain value. In the case of the conventional engine, it is impossible to freely increase the exhaust recirculation rate if the stoichiometric air-fuel ratio is employed because misfires and/or quenching occur when the recirculation rate exceeds about 10% as indicated by the cross mark (x) on the curve A'. Since the quantity of NOx is not satisfactorily small at this recirculation rate, a lower air-fuel ratio represented by the curve B', for example, must be employed to still decrease the quantity of NOx. Even at this air-fuel ratio, misfires occur at the cross mark on the curve B' which corresponds to a recirculation rate slightly above 10%. The air-fuel ratio, therefore, must be lowered greatly as represented by the curves C' and D' until the quantity of NOx becomes satisfactorily small without accompanying the occurrence of misfires. As the result, a noticeable increase in the specific fuel consumption is inevitable.

In an engine system according to the invention with the provision of at least two spark plugs in a spaced and generally symmetrical arrangement for each combustion chamber, misfires occur only when an extremely high recirculation rate (above 40%) is employed even by the employment of a stoichiometric air-fuel ratio (as seen from the cross mark on the curve A). A stable and rapid combustion can be assured even when the air-fuel ratio is slightly higher than the stoichiometric ratio. The employment of an air-fuel ratio close to the stoichiometric ratio is quite favorable to prevent an increase in the specific fuel consumption also in an engine system according to the invention. Based on the above described consideration and confirmative experiments, the air-fuel ratio for an engine system according to the invention is settled within the range from 13 to 16 when the fuel is gasoline. Owing to the provision of two or more distantly arranged spark plugs for each combustion chamber according to the invention and the regulation of the air-fuel ratio to the aforementioned range, the exhaust recirculation rate can be made high enough to remarkably suppress the formation of NOx without causing substantial deterioration of stability, responsiveness or fuel consumption of the engine.

What is claimed is:
1. An automotive engine system comprising:
an internal combustion engine, each combustion chamber thereof being circular in cross section and equipped with at least two spark plugs which are spaced from each other and arranged generally symmetrically in plan view taken parallel to said cross section with respect to a point on the central axis of each combustion chamber so as to be located outside a central region of each combustion chamber;

means for substantially simultaneously energizing said at least two spark plugs;

means for supplying a combustible mixture of air and gasoline with an air/fuel ratio in the range from 13 to 16 to by weight to said each combustion chamber through an induction passage;

a recirculation passage interconnecting the exhaust line of said engine to said induction passage; and a flow rate control means for controlling the flow rate of the exhaust gas through said recirculation passage, the control means including a venturi section formed in said recirculation passage, a valve member arranged to vary the effective cross-sectional area of said venturi section and a valve actuator means for moving said valve member in dependence on the magnitude of vacuum created at a definite section of said induction passage, said venturi section and said valve member being shaped such that the flow velocity of the exhaust gas at said venturi section is equal to the velocity of sound only when the difference in pressure in said recirculation passage between two sections respectively upstream and downstream of said venturi section is at least 120 mmHg, said effective cross-sectional area being such that, when maximized the quantity of the recirculated exhaust gas is in the range from 12 to 40% by volume of the quantity of air drawn into said combustion chambers of said engine, wherein said magnitude of vacuum being taken as an indication of said quantity of air, so that the quantity of the recirculated exhaust gas relative to said quantity of air can be maximized within said range from 12 to 40% while the output of said engine relative to the engine speed is not less than a value corresponding to a road-load condition in a medium range of the engine speed, without causing a further increase in the quantity of exhaust gas under lower load conditions, whereby the exhaust gas can be recirculated in a pre-set and sufficiently large quantity to effectively suppress the formation of NOx in combustion chambers of said engine in the most frequently employed operating conditions of said engine and the combustion of the resulting highly diluted combustible mixture can be completed rapidly enough to maintain the stability of the engine operation.

2. An engine system as claimed in claim 1, wherein the air-fuel mixture supply means is a carburetor, and said definite section is a venturi section of said carburetor and said recirculation passage and said flow control means are arranged such that the quantity of the recirculated exhaust gas is in the range of from 12 to 25% by volume of the quantity of air drawn into each combustion chamber when the velocity of flow of the exhaust gas at said venturi section is equal to the velocity of sound.

3. An engine system as claimed in claim 2, further comprising a reactor adapted to carry out therein oxidation of carbon monoxide and unburned hydrocarbons contained in the exhaust gas of said engine, said reactor being arranged in the exhaust line of said engine at a location close to said each combustion chamber.

4. An engine system as claimed in claim 3, wherein said engine is a multi-cylinder engine having an exhaust port for each combustion chamber, each exhaust port being formed close to another exhaust port for an adjacent and nearest combustion chamber and join said another exhaust port at a short distance from the two combustion chambers to become a single duct.

5. A method of suppressing the emission of nitrogen oxides from an automotive internal combustion engine of the spark ignition type while maintaining stable engine operation and good fuel economy, the method comprising:

supplying a combustible mixture of air and gasoline with an air/fuel ratio in the range from 13:/ to 16:/ by weight to said each combustion chamber through an induction passage;

recirculating a portion of the exhaust gas of the engine to said induction passage through a recirculation passage;

controlling the quantity of the recirculated exhaust gas in dependence on the quantity of air drawn into combustion chambers of the engine, such that the quantity of the recirculated exhaust gas is maximized within the range from 12 to 40% by volume of said quantity of air while the engine speed is in a medium range and the output torque of the engine relative to the engine speed is not less than a value corresponding to a road-load condition without causing a further increase under lower load conditions; by utilizing a valve positioned in a venturi section of said recirculation passage to produce a flow velocity of gas in said passage equal to the speed of sound when the pressure difference across the venturi passage is at least 120 mmHg, and igniting a compressed mixture of said combustible mixture and the recirculated exhaust gas in each combustion chamber of the engine by sparking substantially simultaneously at two distant locations which are outside a central region of each combustion chamber and generally symetrical in plan view taken parallel to said cross section with respect to a point on the central axis of each combustion chamber.

6. A method as claimed in claim 5, wherein said two distant locations are such a relation to each other that flame propagation started at each of said tow distant locations occupies approximately half the volume of each combustion chamber.

7. A method as claimed in claim 6, wherein a carburetor is used to supply said air-fuel mixture, the venturi section of said carburetor being employed as said definite section and said recirculation passage and said flow control means are arranged such that the quantity of the recirculated exhaust gas is in the range of from 12 to 25% by volume of the quantity of air drawn into each combustion chamber when the velocity of flow of the exhaust gas at said venturi section is equal to the velocity of sound.

* * * * *